(12) United States Patent
Zang et al.

(10) Patent No.: US 12,361,038 B2
(45) Date of Patent: Jul. 15, 2025

(54) KNOWLEDGE BASE QUESTION-ANSWERING SYSTEM UTILIZING A LARGE LANGUAGE MODEL OUTPUT IN RE-RANKING

(71) Applicant: AT&T Intellectual Property I, L.P., Atlanta, GA (US)

(72) Inventors: Chuanyun Zang, Cumming, GA (US); Mark Austin, Lucas, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/503,527

(22) Filed: Nov. 7, 2023

(65) Prior Publication Data

US 2025/0147991 A1  May 8, 2025

(51) Int. Cl.
  *G06F 16/3329* (2025.01)
  *G06F 16/31* (2019.01)
  *G06F 40/20* (2020.01)

(52) U.S. Cl.
  CPC .......... *G06F 16/3329* (2019.01); *G06F 16/31* (2019.01); *G06F 40/20* (2020.01)

(58) Field of Classification Search
  CPC ....... G06F 16/3329; G06F 16/31; G06F 40/20
  See application file for complete search history.

(56) References Cited

U.S. PATENT DOCUMENTS

| | | | |
|---|---|---|---|
| 2019/0236130 A1* | 8/2019 | Li | G10L 15/22 |
| 2020/0349181 A1* | 11/2020 | Carbune | G06F 16/3347 |
| 2021/0216576 A1* | 7/2021 | Staub | G06Q 30/0282 |
| 2021/0240775 A1* | 8/2021 | Liu | G06F 16/9035 |
| 2023/0325154 A1* | 10/2023 | Arcadinho | G06F 40/40 |
| | | | 717/113 |
| 2024/0038226 A1* | 2/2024 | Nouri | G06F 40/35 |
| 2024/0062019 A1* | 2/2024 | Aberle | G06N 3/0475 |

* cited by examiner

Primary Examiner — Dangelino N Gortayo
(74) Attorney, Agent, or Firm — Guntin & Gust, PLC; Miyong Shin

(57) ABSTRACT

Aspects of the subject disclosure may include systems and methods, for example, including receiving a user input in natural language, retrieving a first answer including a list of a first number of documents relevant to the user input by searching indexed documents in a knowledge base, applying the first answer to a large language model reader, resulting in a second answer, re-ranking the first answer by using the second answer, resulting in a third answer including a re-ranked list of the first number of documents, and generating a final response including the second answer and one or more documents among the third answer.

20 Claims, 8 Drawing Sheets

KNOWLEDGE BASE QUESTION-ANSWERING SYSTEM UTILIZING A LARGE LANGUAGE MODEL OUTPUT IN RE-RANKING

FIELD OF THE DISCLOSURE

The subject disclosure relates to knowledge based question-answering systems and methods that utilize output of large language models (LLMs) in a re-ranking process of retrieved answers.

BACKGROUND

Natural language processing allows computers to understand a user's query in natural language and generate an output relevant to the user's query. Accordingly, computers can comprehend, interpret and manipulate human language and process voice data and text data which are generated from various sources such as search queries, voice calls, emails, social media, videos, audios, etc.

When a user query or question is received and processed using the natural language processing, answers to the user query or question may be ranked incorrectly as the context and intent of the user query or question is not considered. Instead, answers can be ranked based on a number and/or the extent of matching phrases between documents or article and the user query or question. For instance, a document or article that has the matching phrases may be ranked as the most relevant answer despite presence of another document that is more relevant to the context or intent of the user query without matching phrases.

BRIEF DESCRIPTION OF THE DRAWINGS

Reference will now be made to the accompanying drawings, which are not necessarily drawn to scale, and wherein.

DETAILED DESCRIPTION

Figure 1:
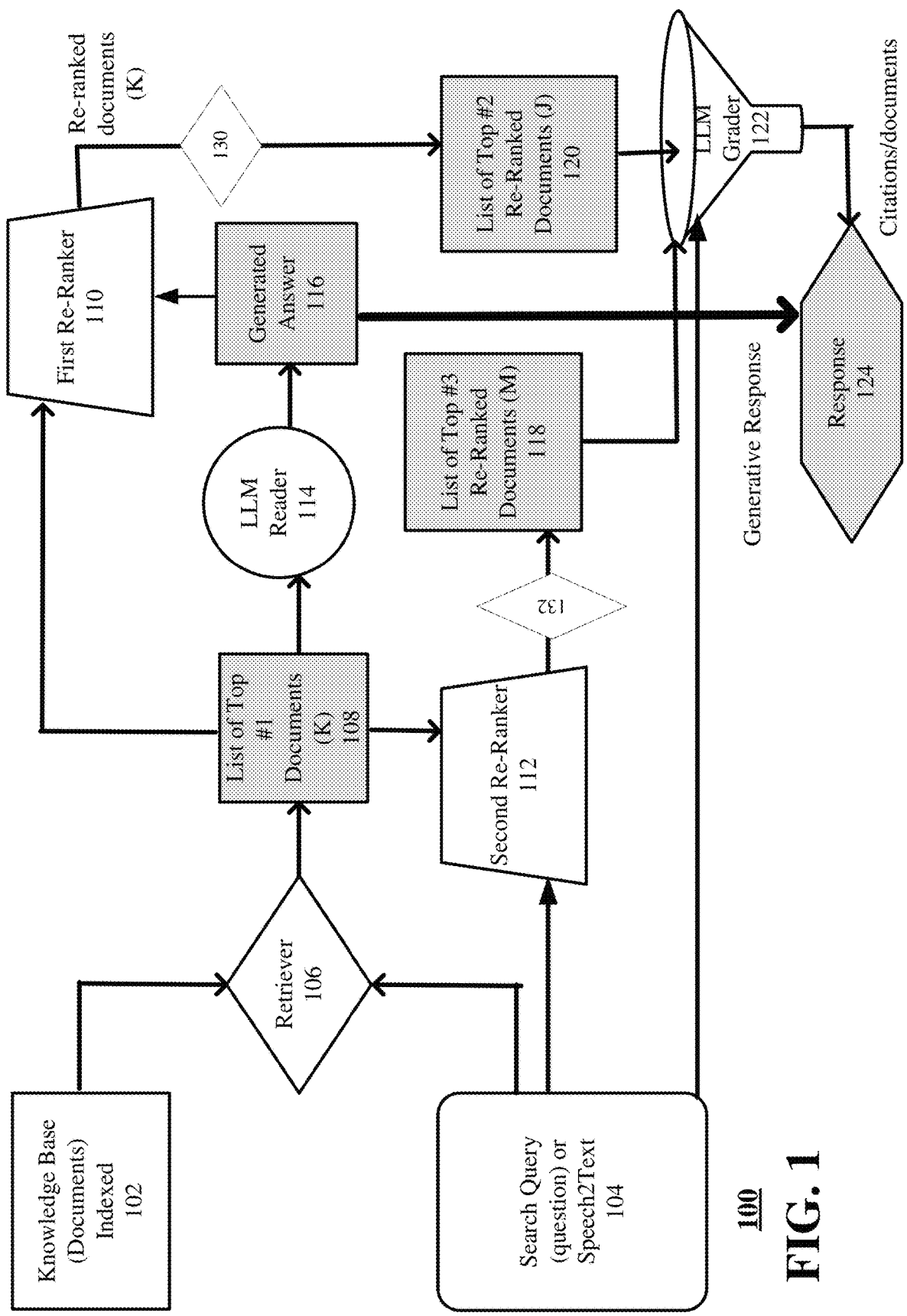
FIG. 1 is a block diagram illustrating an example, non-limiting embodiment of a knowledge base question-answering system in accordance with various aspects described herein.

The subject disclosure describes, among other things, illustrative embodiments for knowledge based question-answering systems and methods that utilize large language models (LLMs) prior to re-ranking of retrieved answers such that the context or intent of a user query is reflected in the re-ranking of the retrieved answers. Other embodiments are described in the subject disclosure.

One or more aspects of the subject disclosure include a device having a processing system including a processor, and a memory that stores executable instructions that, when executed by the processing system, facilitate performance of operations. The operations include receiving a user input in a form of a question or query in natural language, retrieving a first answer including a list of a first number of documents relevant to the user input by searching indexed documents in a knowledge base, applying the first answer to a large language model reader, resulting in a second answer, re-ranking the first answer by using the second answer, resulting in a third answer including a re-ranked list of the first number of documents, and generating a final response including the second answer and one or more documents among the third answer.

One or more aspects of the subject disclosure include a non-transitory machine-readable medium, comprising executable instructions that, when executed by a processing system including a processor, facilitate performance of operations. The operations include (i) receiving a user input in natural language, (ii) retrieving a first answer including a list of a first number of documents relevant to the user input by searching indexed documents in a knowledge base, (iii) applying the first answer to a large language model reader, (iv) performing first re-ranking of the first answer using an output of the large language model reader, resulting in a re-ranked list of documents and having the first number of documents, (v) separately from and independently of applying the first answer to the large language model reader, routing the first answer directly to perform second re-ranking, resulting in another re-ranked list of documents from the first answer and having the first number of documents, (vi) providing, to a large language model grader, a first reduced set of documents from the re-ranked list of documents, (vii) providing, to the large language model grader, a second reduced set of documents from the another re-ranked list of documents, (viii) applying the large language model grader by using a prompt or criteria that grade the first reduced set of documents and the second reduced set of documents, and (ix) generating a final response including the output of the large language model reader as a generative response and graded results of the first reduced set of documents and the second reduced set of documents.

One or more aspects of the subject disclosure include a method having steps of (i) receiving, by a processing system including a processor, a user input in natural language, (ii) retrieving, by the processing system, a first answer including a list of a K number of documents relevant to the user input by searching indexed documents in a knowledge base, (iii) applying, by the processing system, the first answer to a large language model reader, resulting in a second answer, (iv) re-ranking, by the processing system, the first answer, resulting in a third answer including a re-ranked list of documents and having the K number of documents, (v) generating a first reduced set of documents from the third answer, wherein the first reduced set of documents includes a J number of documents, and K and J are natural numbers and K is greater than J, (vi) providing, by the processing system, the first reduced set of documents to a large language model grader, and (vii) generating a final response including the second answer and the first reduced set of documents as citations to the second answer.

FIG. 1 is a block diagram illustrating an example, non-limiting embodiment of a knowledge base question-answering system in accordance with various aspects described herein. The knowledge base question-answering system 100 includes a knowledge base 102, a retriever 106, a first re-ranker 110, a second re-ranker 112, a large language model reader (LLM reader) 114, and a large language model grader (LLM grader) 122.

In some embodiments, the knowledge base 102 may take a form of a self-serving online library of information about a product, service, a subject, etc. The knowledge base 102 is created to ensure that users or customers can find answers to their questions. Additionally or alternatively, the knowledge base 102 includes documentation that users or customers can understand and use to answer their questions. In some embodiments, the knowledge base 102 may include a collection of interlinked information and knowledge in a way that enables storage, analysis and reuse of the knowledge in a machine accessible way.

In some embodiments, the knowledge base 102 includes more than a simple database and is directed to an organized collection of data that resembles how a human organizes information. For instance, the knowledge base 102 classifies data and applies rules for interpreting the data. A traditional database may store information in the same way, whereas the knowledge base 102 organizes the data and information in the way that users or entities understand and utilize as needed. In some embodiments, the knowledge base 102 combines data and data interpretation rules from various applications.

In some embodiments, the knowledge base 102 is enabled to allow users or customers to perform search, content retrieval, etc. One example of the known knowledge base is Google's Knowledge Graph which allows users to find some types of entities such as book, educational or government organization, movie, periodical, video games, websites, etc. Accordingly, the knowledge base 102 uses indexing such that article content and meta data after processing is stored and optimized for searching.

In some embodiments, the knowledge base 102 includes data from various different sources such as contributors adding information (e.g., documents or articles) to the knowledge base 102. Documents or articles added or saved to the knowledge base 102 may be subject to preprocessing and indexing processes which include stripping out HTML (Hyper Text Markup Language), tokenization of the text, removing punctuation, lowercasing all tokens, stemming, embedding, processing all tokens based on primary search language, adding synonyms for matching tokens, etc. Saved articles or documents can be re-indexed based on changes to search settings. Reindexing involves reanalyzing and redigesting contents. In some embodiments, the indexed documents or articles can be saved in a vector database which can be searchable.

Figure 4:
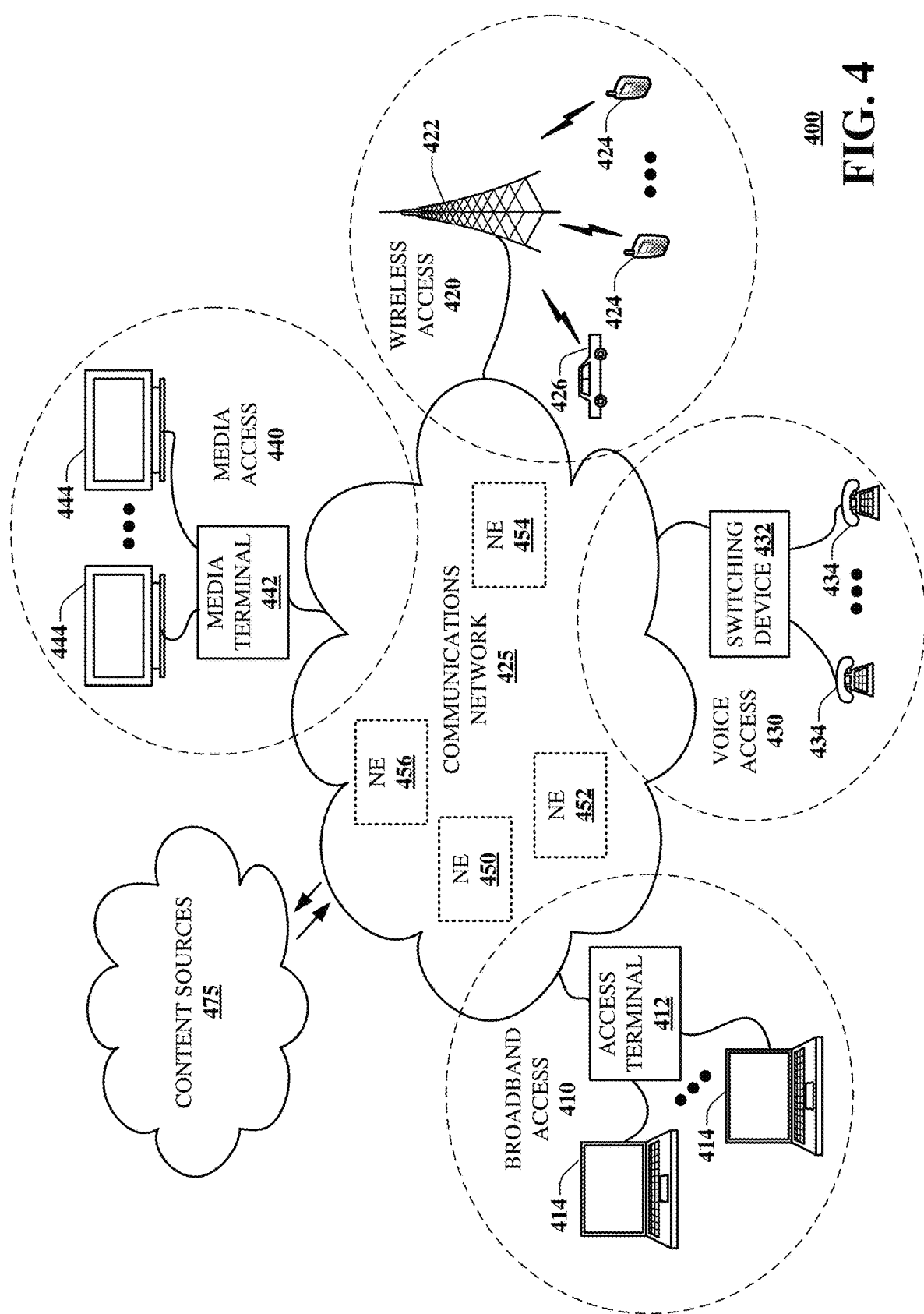
FIG. 4 is a block diagram illustrating an exemplary, non-limiting embodiment of a communications network in accordance with various aspects described herein.
Figure 5:
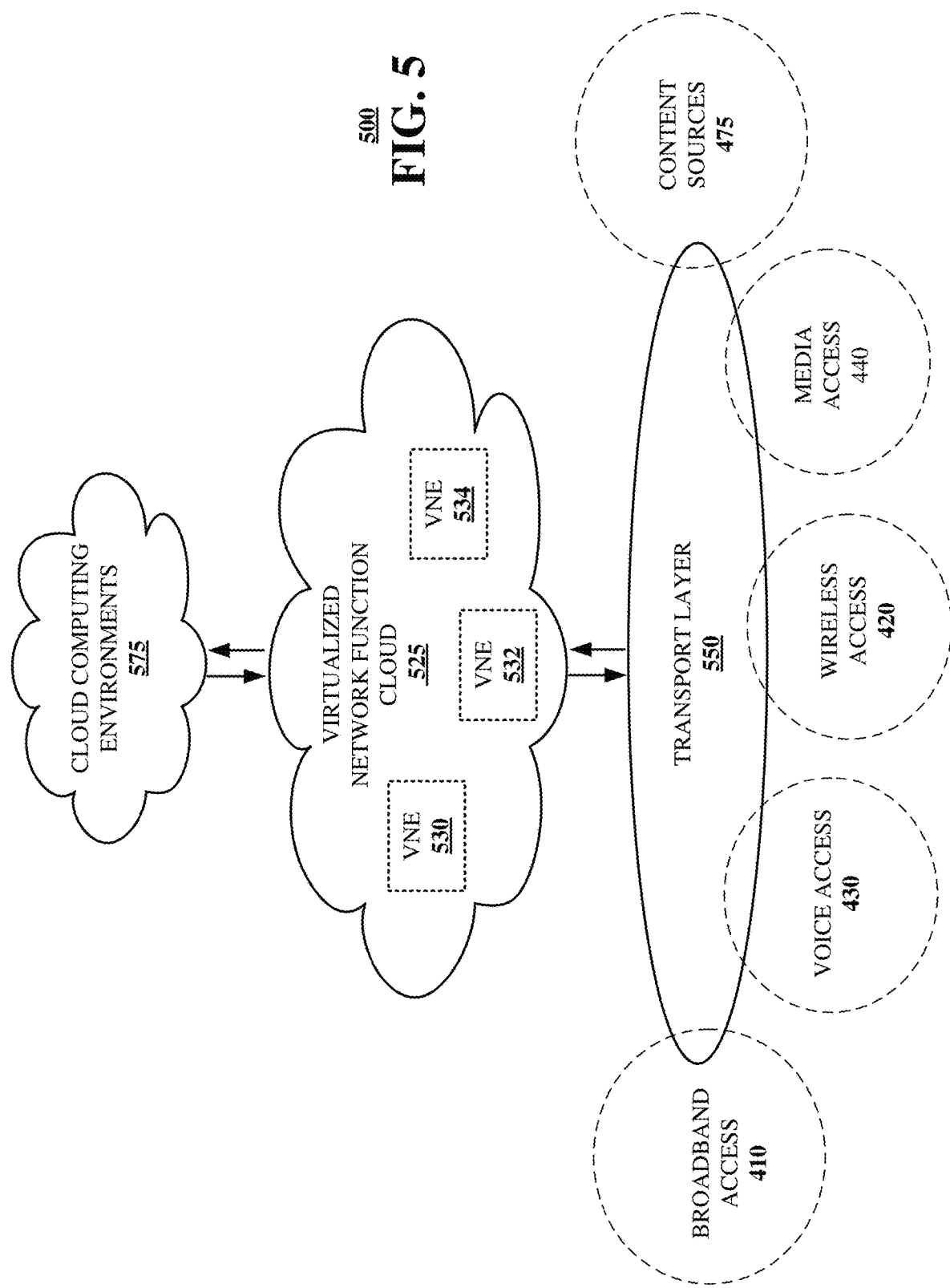
FIG. 5 is a block diagram illustrating an example, non-limiting embodiment of a virtualized communication network in accordance with various aspects described herein.

In various embodiments, the knowledge base 102 may be directed to one or more particular subject matter that suits the need of users or customers. For instance, the knowledge base 102 may include articles that address customer services of communications networks as depicted in FIGS. 4-5. In response to queries or questions from network users or customers, the knowledge base question-answering system 100 may use the knowledge base 102 to provide relevant responses to the queries or questions.

In various embodiments, the knowledge base 102 can store documents or articles that provide natural language responses to customers or users. In some embodiments, the knowledge base 102 may be searched to answer a natural language question. In some embodiments, the knowledge base 102 stores the documents or articles in predetermined forms, such as [entity, relation, object], and each item of the forms may have properties or conditions attached as qualifiers. As one example, "Jane got married to Paul on Dec. 1, 2010 at Holy Catholic Church" can be represented by [Jane, Spouse, Paul], with the qualifiers, start time=Dec. 1, 2010 and place of marriage=Holy Catholic Church.

As another example, the knowledge base 102 can be searched and used to answer a question, "Where was Barack Obama born?" using [Barack Obama, birthplace, Hawaii]. For more complicated questions, the knowledge base 102 may be employed with constrained relation, multi-hope reasoning, numeral operations, etc. In some embodiments, the knowledge base 102 may utilize different methodologies to answer complicated questions (e.g., including multiple relations or multiple fact checking/searching, etc.). For instance, semantic matching methods may decompose an answering task into entity detection, entity linking, and relation detection. For instance, a question is "Who wrote the books of Harry Potter?" Harry Potter is identified as an entity which is linked to a list of candidates (e.g., book, movie, play, music, etc.). Among the list of candidates, the book is related to author, genre, subject, the published time, etc. and the author relation is selected, thereby leading to a final response. The knowledge base 102 may be searched and used to parse a natural language question into a logical form and provide predicted answers by searching the knowledge base 102 with the parsed logic form. As another example, the knowledge base question and answering system 100 may be used to retrieve and rank answers therefrom in response to information contained in user questions.

As additional examples, the knowledge base 102 include numerous articles relating to customer services for communications networks, as depicted in FIGS. 4-5. A network user may inquire about "what is my data limit according to my plan?" or "Is there a data outage situation in my area?," etc. The system 100 may search through the knowledge base 102 to retrieve a list of documents that are relevant to the queries from the network user and provide responses to the user's queries.

In various embodiments, search tools available in the relevant fields can be used in the knowledge base 102. The retriever 106 is configured to retrieve relevant answers to input query or questions using various search tools or functions. The present disclosure is not limited to a particular search function. Search and content application program interface, a vector database, etc., which are described above in connection with the knowledge base 102, can be used to retrieve a list of relevant answers with the retriever 106 in searching the knowledge base 102. Other search methods, tools, engines, etc., which are available in the pertinent technical field of the present disclosure, can be used to retrieve a list of relevant answers with the retriever 106 in searching the knowledge base 102.

In various embodiments, the user query or questions 104 can be in text form by being input as text or converted from speech, e.g., via automatic speech recognition engines. The user query or questions 104 can be input in natural language form, or any other forms such as keywords, Universal Resource Locator (URL) links, etc. The user query or questions 104 can be a simple question, or complicated questions. In some embodiments, predicted questions from users or customers regarding particular subjects or topics in connection with products, services, entities, industries, etc. may be reviewed and can be used to build the knowledge base 102 in order to address the user query or questions. By using the communications network example, the knowledge base 102 may be built to contain documents or articles regarding the operations and use of the communications network.

In various embodiments, the user query or questions will be subject to preprocessing using the same or similar preprocessing techniques used for the knowledge base 102, such as stripping out HTML (Hyper Text Markup Language), tokenization of the text, removing punctuation, lowercasing all tokens, stemming, embedding, processing all tokens based on primary search language, adding synonyms for matching tokens, etc. Additionally, the user query or questions may be indexed using embedding models that are available and used with language models. For instance, embedding models may include representation of words and documents in the form of numeric vectors such that words can have corresponding vector representations. The indexed user query or questions can be saved in a vector database which can be searchable. In some embodiments, the user query or questions use the same or similar embedding models used by the knowledge base 102 for using the retriever 106.

As a result of searching the relevant content from the knowledge base 102, a list of top contents or documents 108 relevant to the user query 104 is retrieved by the retriever 106. The list of top contents or documents retrieved by the first retriever 106 may include a large set of documents or articles relevant to and responsive to the user query or questions 104. These retrieved documents or articles become candidate documents for a response to the user query or question 104 to serve as citations for a generative response. By way of example, the search and retrieval by the retriever 106 can be performed using various techniques such as vector space models, probabilistic models, neural information retrieval methods, or dense passive retrieval methods.

In various embodiments, a vector space model represents text documents as vectors of identifiers and is used in information retrieval, indexing and relevancy rankings. Probabilistic modeling uses a statistical technique used to consider the impact of random events or actions in predicting the potential occurrence of future outcomes such as weather forecasting and postal delivery. Neural information retrieval methods use neural networks to rank search results in response to a query. Dense passive retrieval methods use a dense passage retriever for fetching relevant passages with regard to questions asked based on the similarity between high-quality low-dimensional continuous representation of passages and questions. For instance, semantically similar words such as hey, hello, hi, may not be viewed as a match by a certain method, but the dense passive retriever considers semantic meaning.

In some embodiments, a number of candidate documents in the list of top contents or documents retrieved by the retriever 106 corresponds to a first number K, where the first number K corresponds to a large number of relevant documents or articles. In some embodiments, the first number K may vary depending on the retrieval methods used with the retriever 106.

In some embodiments, the knowledge base question-answering system 100 includes the first re-ranker 110 and the second re-ranker 112. In some embodiments, the first re-ranker 110 can be implemented by using algorithms such as BM25, a cross encoder, etc. In information retrieval, BM25 is ranking function used by search engines to estimate the relevance of documents to user queries or questions. BM25 ranks a set of documents based on query terms appearing in each document, regardless of the inter-relationship between the query terms within a document such as relative proximity. A cross encoder does not produce a sentence embedding and input multiple sentences to an encoder. The cross encoder can be used with a pre-defined set of sentences pairs such as 100 sentence pairs and similarity scores of the 100 pairs. Metrics of relevance used in the first re-ranker 110 can be similarity score, L2 distance, dot product, etc. The similarity score corresponds to a percentage of text found within sources in the comparison database. L2 distance calculates the distance of the vector coordinates from the origin of the vector space. The dot product is an algebraic operation that takes two equal-length sentences of numbers (coordinate vectors), and returns a single number.

In some embodiments, the first re-ranker 110 and the second re-ranker 112 may be configured to have the same or similar architecture and operations/functions. As one example, the first and the second re-rankers 110 and 112 may be implemented with a language model transformer, such as BERT (Bidirectional Encoder Representations from Transformers) models. By way of example, the first and the second re-rankers 110 and 112 are configured to compare the candidate documents or articles in the retrieved list 108 with respect to respective different references and compute similarity scores between each candidate documents of the list 108 and the respective references. Specifically, the first re-ranker 110 is configured to compute the similarity between each of candidate documents in the list of documents 108 and a generated answer 116. On the other hand, the second re-ranker 112 determines the similarity between each of candidate documents in the list of documents 108 and the user query 104.

In some embodiments, the first re-ranker 110 and the second re-ranker 112 may be provided with different inputs or different references. As depicted in FIG. 1, the list of retrieved documents having the first number K is provided to the second re-ranker 112 and the user query or question 104 is another input to the second re-ranker 112. However, as depicted in FIG. 1, the first re-ranker 110 receives the list of retrieved documents 108 as one input and the output of the large language model (LLM) reader 114 (i.e., the generated answer 116) as another input. In other words, the first re-ranker 110 performs re-ranking by using the output of the LLM reader 114, whereas the second re-ranker 112 performs re-ranking by using the user query or question 104 without using the output of the LLM reader 114.

In some embodiments, a large language model (LLM) uses artificial intelligence algorithm and is trained with large data sets to understand input and generate and predict output. LLMs are used for natural language processing applications where a user inputs a query in natural language and LLMs can be used to generate a response relevant to the user's query.

Some of modern LLMs use transformer models such as OpenAI's ChatGPT, Microsoft's Bing AI, Google's Bard, and others. Generative pre-trained transformers (GPT) are a family of models that use deep learning to generate natural language or code from a given input. To implement the architecture of GPT, neural networks are used to process text or speech, and vast amounts of unstructured (often unlabeled) text data are used in a training stage. The present disclosure is not limited to particular LLMs, and operators or users of the knowledge base question-answering system 100 can select the size and the complexity of LLM models to meet their budget and their expected level of accuracy.

In some embodiments, with regard to the first re-ranker 110, the list of the retrieved candidate documents 108 is fed to the LLM reader 114 before reaching the first re-ranker 110. In other embodiments, to the contrary, the second re-ranker 112 does not use an output from an LLM reader like the LLM reader 114.

In some embodiments, LLMs can be trained on a massive amount of data and enabled to perform various tasks such as answering questions in natural language. The LLM reader 114 is configured and trained to extract and summarize key information that is most relevant to the user's query or questions among the list of the retrieved candidate documents 108. In some embodiments, with a proper prompt, the generated answer 116 may provide a highly relevant response to the user's query or question 104. In various embodiments, the generated answer 116 includes a single best answer. As depicted in FIG. 1, the generated answer 116 is a generative response and provided as a final response 124.

In various embodiments, prompts are instructions to the LLM reader 114. Prompts can be tuned to train the LLM reader 114 to perform specific tasks. Proper prompts include clear and specific instructions and can guide the operations of the LLM reader 114. By way of one example, the prompts can be such as "Please use the context provided, summarize an answer to the questions input." As a result, the LLM reader 114 can summarize each candidate document in the list of documents 108 and generates a short answer 116 to the user's search query 104. For instance, this short, generated answer 116 may be a rephrased sentence based on information from the documents 108 included in the list.

In some embodiments, the generated answer 116 is provided to the first re-ranker 110 together with the list of documents 108 by the retriever 106. The first re-ranker 110 analyzes and reviews similarity between the generated answer 116 and each candidate document in the list of documents 108. The first re-ranker 110 compares each candidate document in the list of documents 108 against the generated answer 116 and computes similarity scores for each candidate document in the list of documents 108. Based on the similarity scores, the first re-ranker 110 performs re-ranking of each candidate document in the list of candidate documents 108.

In various embodiments, the first re-ranker 110 does not change the first number K of the list of documents. Instead, the first re-ranker 110 performs the re-ranking of the list of documents based on the similarity scores. In other words, after the re-ranking by the first re-ranker 110, the re-ranked list of documents include the first number (K) of documents. In some embodiments, a number of documents can be adjusted or reduced by a first result filter 130 which receives the K number of re-ranked documents from the first re-ranker 110. The first result filter 130 is configured to limit the K number of re-ranked documents to a predetermined number, i.e., a second number J which is much smaller than the first number K. By way of example only, the first number K can be over 1000 documents and the second number J can be 10 In some embodiments, operators or users of the system 100 are enabled to select and configure the predetermined number in light of various factors such as business needs, customer basis and demand, etc. Additionally or alternatively, the first result filter 130 is configured to set a threshold similarity score such that candidate documents having the similarity scores lower or higher than the threshold similarity score can be filtered to be the second number (J) of documents.

As discussed above, the first re-ranker 110 can be implemented by using algorithms such as BM25, a cross encoder, etc. Metrics of relevance used in the first re-ranker 110 can be similarity score, L2 distance, dot product, etc.

The second re-ranker 112 performs re-ranking of each candidate document in the list of documents 108 against the user query or question 104. As described above, the list of documents 108 includes the K number of candidate documents (e.g., over 1000 documents) and at the second re-ranker 112, the K number of candidate documents is reranked based on similarity with respect to the user query or question 104. In other words, the second re-ranker 112 does not change or reduce the first number (K) of documents. A second result filter 132 is arranged past the second re-ranker 112 and configured to reduce the first number (K) of documents to a third number (M) of documents. Additionally or alternatively, the second result filter 132 is configured to set a threshold similarity score such that candidate documents having the similarity scores lower or higher than the threshold similarity score can be filtered to be the third number (M) of documents. In some embodiments, operators or users of the system 100 are enabled to select and configure the predetermined number or the threshold similarity score in light of various factors such as business needs, customer basis and needs, etc.

The second re-ranker 112 can be implemented by using algorithms such as BM25, a cross encoder, etc. as described above in connection with the first re-ranker 110. Metrics of relevance used in the second re-ranker 110 can be similarity score, L2 distance, dot product, etc. The second re-ranker 112 re-ranks the list of the retrieved documents 108 to be a smaller number of the list of re-ranked documents 118. As the LLM reader 114 is not used, analysis of the context and summarization may not be performed. Accordingly, it is possible that the re-ranked result by the second re-ranker 112 leading to the list of the re-ranked results 118 is different from the re-ranked result by the first re-ranker 110.

In various embodiments, the first result filter 130 generates a first reduced set of documents from the re-ranked documents, by the first re-ranker 110. The first reduced set of documents include the second number (J) and is provided to the LLM grader 122. The second result filter 132 generates a second reduced set of documents from the re-ranked documents, by the second re-ranker 112. The second reduced set of documents includes the third number (M) and is provided to the LLM grader 122. The LLM grader 122 can be guided or instructed with proper prompts or criteria. In various embodiments, prompts are instructions to the LLM grader 122. Prompts can be tuned to train the LLM grader 122 to perform specific tasks. Proper prompts include clear and specific instructions and can guide the operations of the LLM grader 122. The proper prompt or criteria include determining or filtering better citations to be included in a final response 124 can be output. By way of example, the proper prompt or criteria can be "Your task is to compare the candidate documents by checking which one answers the user query or question better. Grade each of candidate documents using scale 1 to 10, with 1 as the worst and 10 as the best. Output the answer and candidate documents with grades."

As depicted in FIG. 1, the LLM grader 122 is provided with the user query or question 104 in order to grade the first reduced set of documents having the second number (J) 120 and the second reduced set of documents having the third number (M) 118. The LLM grader 122 is configured to grade the first and the second reduced sets of documents against the user query or question 104. As a result of the grading, the first and the second reduced sets of documents are presented, in the order or scale of grading, as citations or document responses in the final response 124. Accordingly, the final response 124 is generated which includes the generated answer 116 from the LLM reader 114 as a generative response and the citations or document responses from the LLM grader 122 in support of the generated answer 116.

Figure 2:
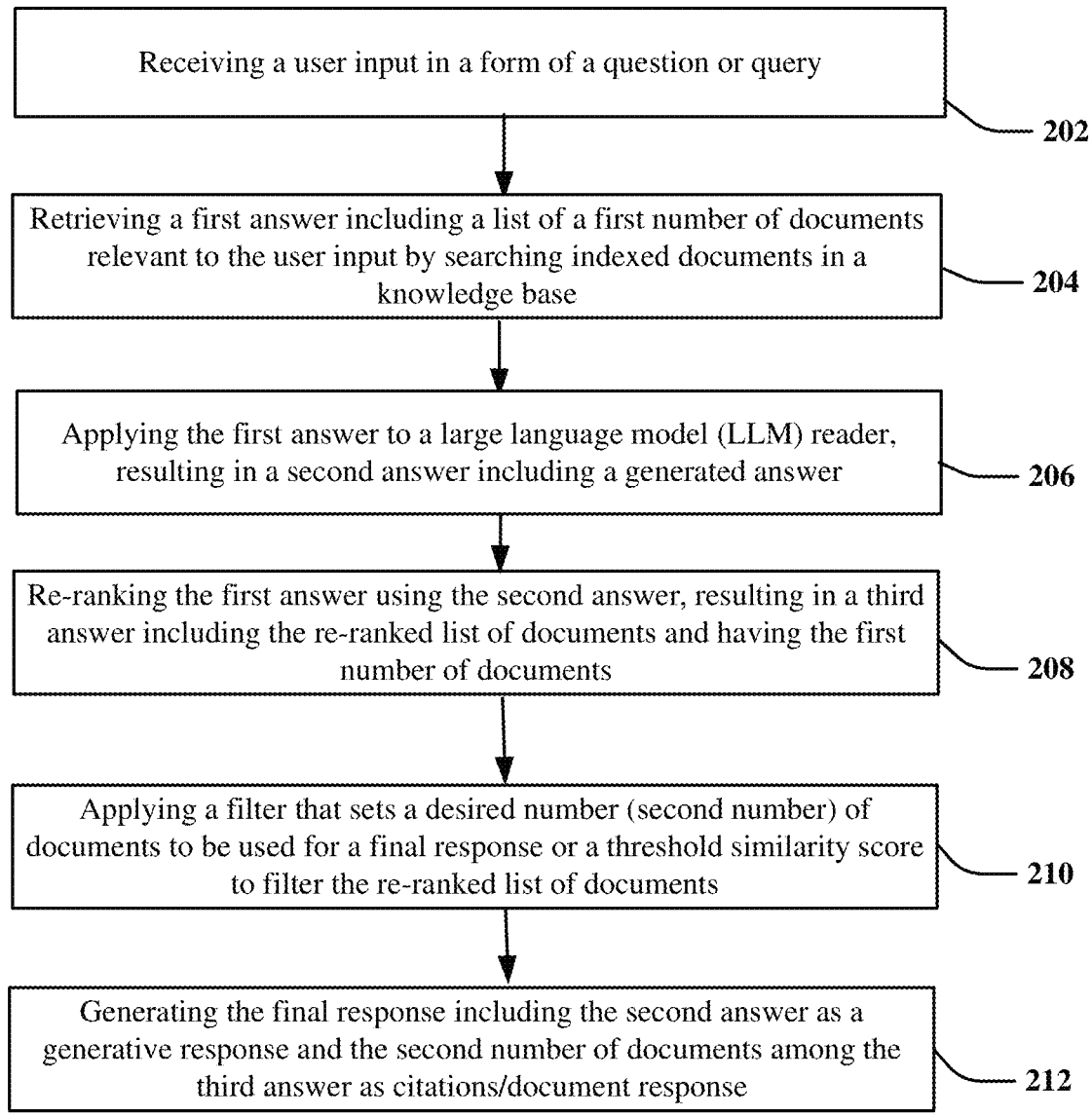
FIG. 2 depicts an illustrative embodiment of a method in accordance with various aspects described herein.

FIG. 2 depicts an illustrative embodiment of a method in accordance with various aspects described herein. The method 200 is directed to providing an answer to a user query or question in natural language using a knowledge base. The method 200 includes receiving a user input in a form of a question or query (Step 202). The user input is received in natural language. Additionally, or alternatively, the user input can be received as text input or speech input converted into text input. As described above in connection with FIG. 1, the knowledge base may be built to contain information targeting particular topics for which the user input is expected. In some embodiments, the knowledge base may be built to address particular products, services, industries, etc. of users, customers, operators, etc.

By way of example only, the knowledge base includes the following set of articles or documents:

Document 1: "List of organisms or animals with the largest lifespan: Some confirmed sources estimate bowhead whales to have lived at least 211 years of age."

Document 2: "Maximum life span: One animal that has the largest lifespan is Koi (a Japanese species of fish, allegedly living up to 200 years, though generally not exceeding 50.)"

Document 3: "Greenland Shark: The Greenland shark is the longest living vertebrate specie (estimated to be between 250 and 500 years) and is among the largest extant species of shark."

Document 4: "Largest prehistoric animals: The largest prehistoric animals include both vertebrate and invertebrate species."

Document 5: . . . .

. . . .

Document N: . . . .

For instance, the user's query or questions are: "which animal has the largest lifespan?" In some embodiments, the user's query or questions may be converted from speech as needed, for example, via an automatic speech recognition engine, or provided as text input such as entering the query in a search window.

In response to the received user's query or question, a first answer including a list of a first number of documents or articles, relevant to the user input, is retrieved by searching indexed documents or articles in the knowledge base (Step 204). For the purposes of explanations, in the above knowledge base example, Document 1 through Document 3 are retrieved in response to the user input where the first number equals to 3. The present disclosure is not limited to this example, and in practical applications, the first number can be much greater than 3.

The method 200 further includes applying the first answer to a large language model (LLM) reader, resulting in a second answer (Step 206). The first answer includes the retrieved list of the first number of documents, and the second answer includes a generated answer (Step 206). In some embodiments, the LLM reader is configured to reduce the first number of documents to a single answer as a generative response. Alternatively, the LLM reader can be configured to generate a smaller number of results. Using the above example, a number of the second answer is configured to be 1 which is reduced from the first number, 3.

In Step 206, the LLM reader is applied to Document 1 through Document 3 before re-ranking. In some embodiments, the LLM reader is provided with instructions or prompts such as "Please use the context provided, summarize an answer to the questions input." The LLM reader is then configured to analyze the context of the user input and give a summarization. Using the above example, the summarization can be such as "Greenland Shark has the longest lifespan" or to that effect, which becomes and will be used as a generative response to the user input.

Based on the generated answer 116 which is the output of the LLM reader, the first answer is re-ranked, resulting in a third answer including the re-ranked list of documents (Step 208). The re-ranking by the first re-ranker 110 as depicted in FIG. 1 includes comparing similarity of the first answer against the generated answer 116 by the LLM reader 114 and computing similarity scores for each candidate documents in the list of documents 108. In some embodiments, the third answer may have the first number of documents which is not changed as the third answer involves and reflects the re-ranking of the first answer based on the similarity scores. For instance, based on the generated answer 116 by the LLM reader, Document 3 is reranked as the top relevant document and provided as the citation for the response, "Greenland Shark has the longest lifespan," in the final response (Step 212). This result may be different from a conventional approach which will likely rank Document 2 as the top relevant document. For instance, Document 2 includes the phrase, "the largest lifespan" which matches with the user input. As the analysis of the context by the LLM reader is not performed, the content of Document 3 may be disregarded or not considered as relevant as Document 2.

Referring back to FIG. 2, the third answer is fed to a filter that sets a desired number of documents to be used for the final response or a threshold similarity score to filter and reduce the third answer to a second number of documents (Step 210). In some embodiments, the second number of documents is smaller than the first number of documents, for example, 1000 documents (the first number of documents) being reduced to 10 documents (the second number of documents) by the filter. The present disclosure is not limited thereto and many different numbers or other criteria can be used to filter the documents.

One or more top ranked documents included in the third answer, i.e., the second number of documents among the third answer, are provided as citations or document responses in a final response (Step 212). The second answer is provided as a generative response in the final response (Step 212). The final response is generated which includes a predetermined number of top ranked documents based on the setting of the filter (Step 210). For instance, an operator of the knowledge base question-answering system is enabled or allowed to define or modify the setting of the filter. In the foregoing example, a small number of documents (i.e., 3 documents) is used for convenience of explanation and after applying the LLM reader and the re-ranking, one document that is ranked at the top in a final list of documents is generated as the final response. However, the present disclosure is not limited thereto. In practical applications, the knowledge base and the first answer including the list of the first number of documents may involve a large number of documents or articles (e.g., several millions of documents or articles). After applying the LLM reader and the re-ranking, a predetermined number (e.g., less than ten) of top ranked documents in the re-ranked list included in the third answer can be set or filtered to be used as the final response (Steps 210 and 212). By way of example only, the knowledge base includes more than several millions of documents or article, the first number of documents after the retrieving includes 1000 plus documents or articles, the second number of documents after applying the LLM reader and the re-ranking may be reduced to 10 documents or articles based on the setting at the filter, and top ten ranked documents in the list of 1000 documents or articles can be provided as citations in the final response along with the second answer as the generative response. (Step 212).

Figure 3:
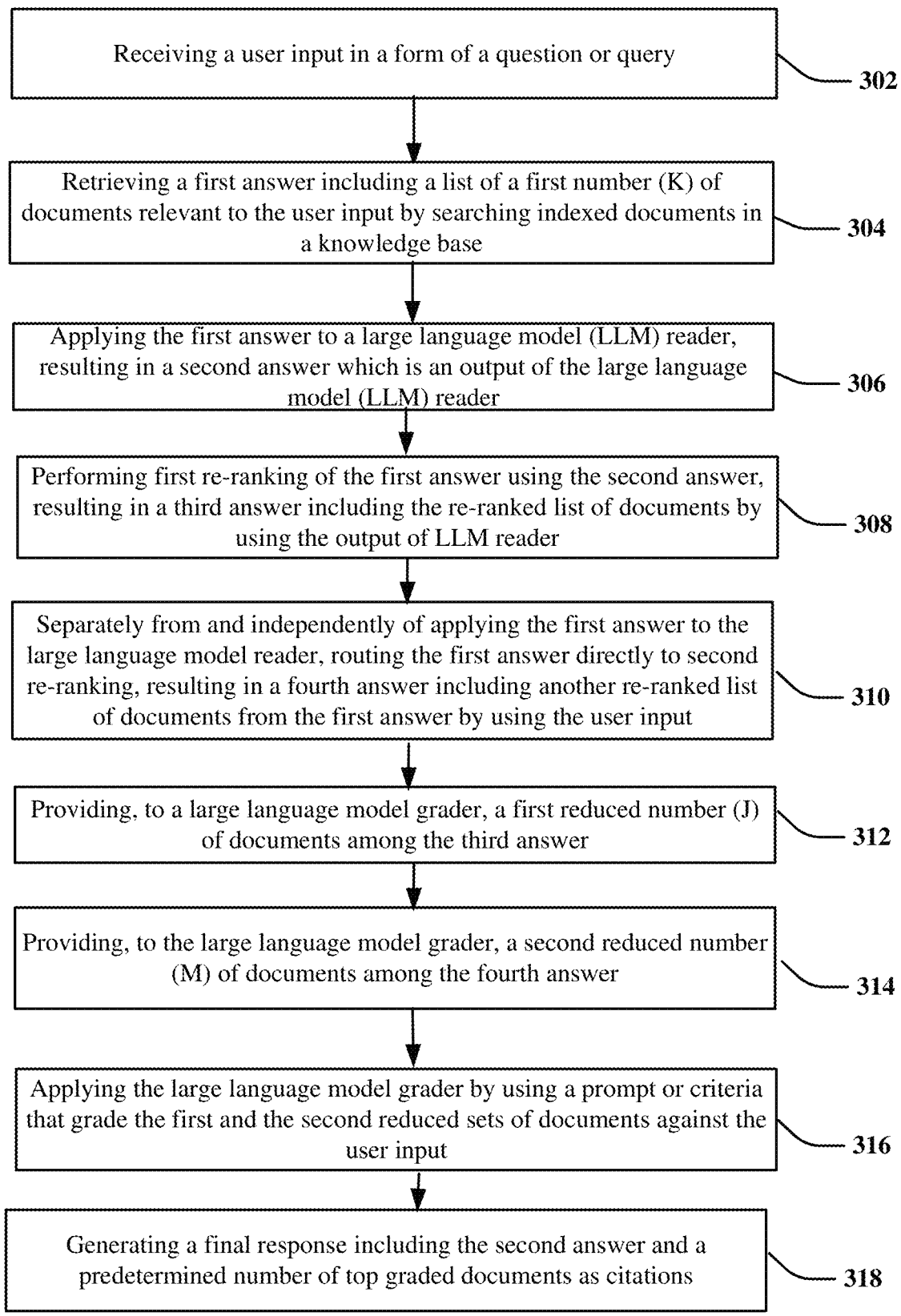
FIG. 3 depicts another illustrative embodiment of a method in accordance with various aspects described herein.

FIG. 3 depicts another illustrative embodiment of a method in accordance with various aspects described herein. The method 300 is directed to providing an answer to a user query or question in natural language using a knowledge base. The method 300 includes receiving a user input in a form of a question or query (Step 302). The user input is received in natural language. As described above in connection with FIG. 1, the knowledge base may be built to contain information targeting particular topics for which the user input is frequently expected.

In response to the received user's query or question, a first answer including a list of a first number of documents or articles, relevant to the user input, is retrieved by searching indexed documents or articles in the knowledge base (Step 304). For the purposes of explanations, in the above knowledge base example, Document 1 through Document 3 are retrieved in response to the user input where the first number equals to 3.

The method 300 further includes applying the first answer to a large language model (LLM) reader, resulting in a second answer which is an output of the LLM reader (Step 306). By way of example, the second answer can be a single answer which is the best answer to the user input. In some embodiments, an output of the LLM reader is configured to reduce the first number of documents to a single answer. Alternatively, an output of the LLM reader may be configured to include a smaller number of results. Using the above example, the first number of documents included in the first answer is configured to be 1 which is reduced from the first number, 3. Applying the LLM reader may summarize the documents included in the first answer and result in the second answer.

In Step 306, the LLM reader is applied to Document 1 through Document 3 before re-ranking. The LLM reader is configured to give a summarization of the first answer. Using the above example, the summarization can be such as "Greenland Shark has the longest lifespan" or to that effect, which becomes the second answer including a generated answer by the LLM reader from the output of the LLM reader.

Based on the context analysis and the summarization by the LLM reader, the first answer is subject to first re-ranking using the second answer, resulting in a third answer corresponding to the re-ranked first answer by using the output of the LLM reader (Step 308). The third answer includes the re-ranked list of documents and is reduced to a first reduced number (J) of documents via a first filter (Steps 308 and 312). The first reduced number (J) of documents is provided to the LLM grader (Step 312). For instance, based on the summarization by the LLM reader, Document 3 is re-ranked as the top relevant document and provided to the LLM grader (Steps 308 and 312).

The method 300 further includes, separately from and independently of applying the first answer to the large language model reader, routing the first answer directly to second re-ranking, resulting in a fourth answer including another re-ranked list of documents from the first answer by using the user input (Step 310). In other words, the first answer is provided, as an additional route, to the re-ranking of the first answer so as to forgo to use, in the additional route, the large language model reader. (Step 310). Accordingly, the re-ranking of the first answer, in the additional route, generates the fourth answer without applying the large language model reader prior to or subsequent to the re-ranking in the additional route. In this case, as the LLM reader does not analyze the context or provide the summarization, the re-ranking result may be different. For instance, in the above example, Document 2 will likely be ranked as the top relevant document. For instance, Document 2 includes the phrase, "the largest lifespan" which matches with the user input. As the analysis of the context by the LLM reader is not performed, the content of Document 3 may be disregarded or not considered as being more relevant than Document 2.

In some embodiments, the third answer including the re-ranked list of documents are provided to the first filter which outputs the first reduced number (J) of documents based on settings at the first filter. The first reduced number of documents among the re-ranked list of documents is provided to the large language model grader (Step 312). A fourth answer includes another re-ranked list of documents from the list included in the first answer. The fourth answer is fed to a second filter which outputs the second reduced number (M) of documents from the fourth answer. The second reduced number (M) of documents among another re-ranked list of documents in the fourth answer is provided to the large language model grader. (Step 314). As described above in Step 306, the second answer is generated as the output of the LLM reader. In other embodiments, the first filter, the second filter or both may not be used in case a small number of documents is retrieved in response to the user input.

For instance, the third answer is reduced, via the first filter, to a J number of documents and the fourth answer is further reduced, via the second filter, to a M number of documents. The LLM grader is configured to grade each of the J number of documents and each of the M number of documents with a predetermined range of scale with reference to the user input. Each graded scale of the J number of documents is output, and each graded scale of the M number of documents are also output. In some embodiments, the LLM grader is configured to apply various rules or policies such as grading a document having a highest graded scale as the citations in the final response.

In some embodiments, the LLM grader is applied by using a prompt or criteria that grade the first and the second reduced number of documents (Step 316). In some embodiments, the third answer and the fourth answer are graded based on prompts or criteria. For instance, the prompts can be such as "Your task is to compare the candidates by checking which one answer the input question [query] better. Grade each of candidates using scale 1 to 10, with 1 as the worst and 10 as the best. Output the answer and candidate documents with grades." Using the prompt or criteria further includes setting the prompt or criteria that grade the first and the second reduced number of documents against the user input (Step 316). Additionally, using the prompt or criteria further includes grading each document in the first reduced number of documents and each document in the second reduced number of documents with a predetermined range of scale, outputting each graded scale with the corresponding documents. As a result, a final response including a predetermined number of top graded documents included as citations is generated. Furthermore, the final response further includes the second answer as the generative response (Step 318). Using the above example, the LLM grader selects Document 3 as a better choice and provides Document 3 as the citation in the final response (Step 318).

In other embodiments, the retrieval accuracy may drop. Then it is necessary to enlarge the context which may impact the performance of the LLM reader. For instance, there may be noises in the expanded context. Using the above examples, the LLM reader may focus on animal and the first re-ranker re-ranks the first answer (Step 306) which indicates that Document 2 is the best citation and Document 4 follows Document 2.

On the other hand, in Steps 310 and 312, Document 2 and Document 3 can be re-ranked as top-ranked documents. The LLM grader, following the prompts, compares the documents and checks which document is the most responsive to the user input (Step 314). As a result, Document 3 is selected and output as the citation supporting the second answer in the final response (Step 316).

While for purposes of simplicity of explanation, the respective processes are shown and described as a series of blocks in FIG. 2 and FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 4, a block diagram is shown illustrating an example, non-limiting embodiment of a system 400 in accordance with various aspects described herein. For example, system 400 can facilitate in whole or in part the knowledge base question and answering systems and methods. In particular, the knowledge base may contain information relevant to the system 400 and the question and answering systems and methods enable users or customers to obtain a response to a query relating to the system 400.

A communications network 425 is presented for providing broadband access 410 to a plurality of data terminals 414 via access terminal 412, wireless access 420 to a plurality of mobile devices 424 and vehicle 426 via base station or access point 422, voice access 430 to a plurality of telephony devices 434, via switching device 432 and/or media access 440 to a plurality of audio/video display devices 444 via media terminal 442. In addition, communication network 425 is coupled to one or more content sources 475 of audio, video, graphics, text and/or other media. While broadband access 410, wireless access 420, voice access 430 and media access 440 are shown separately, one or more of these forms of access can be combined to provide multiple access services to a single client device (e.g., mobile devices 424 can receive media content via media terminal 442, data terminal 414 can be provided voice access via switching device 432, and so on).

The communications network 425 includes a plurality of network elements (NE) 450, 452, 454, 456, etc. for facilitating the broadband access 410, wireless access 420, voice access 430, media access 440 and/or the distribution of content from content sources 475. The communications network 425 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 412 can include a digital subscriber line access multiplexer (DSLAM), cable modem termination system (CMTS), optical line terminal (OLT) and/or other access terminal. The data terminals 414 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 422 can include a 4G, 5G, or higher generation base station, an access point that operates via an 802.11 standard such as 802.11n, 802.11ac or other wireless access terminal. The mobile devices 424 can include mobile phones, e-readers, tablets, phablets, wireless modems, and/or other mobile computing devices.

In various embodiments, the switching device 432 can include a private branch exchange or central office switch, a media services gateway, VoIP gateway or other gateway device and/or other switching device. The telephony devices 434 can include traditional telephones (with or without a terminal adapter), VOIP telephones and/or other telephony devices.

In various embodiments, the media terminal 442 can include a cable head-end or other TV head-end, a satellite receiver, gateway or other media terminal 442. The display devices 444 can include televisions with or without a set top box, personal computers and/or other display devices.

In various embodiments, the content sources 475 include broadcast television and radio sources, video on demand platforms and streaming video and audio services platforms, one or more content data networks, data servers, web servers and other content servers, and/or other sources of media.

In various embodiments, the communications network 425 can include wired, optical and/or wireless links and the network elements 450, 452, 454, 456, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Referring now to FIG. 5, a block diagram 500 is shown illustrating an example, non-limiting embodiment of a virtualized communication network in accordance with various aspects described herein. In particular a virtualized communication network is presented that can be used to implement some or all of the subsystems and functions of system, the subsystems and functions of system, and method presented in FIGS. 4 and 5. For example, virtualized communication network 500 can facilitate in whole or in part the knowledge base question and answering systems and methods.

In particular, a cloud networking architecture is shown that leverages cloud technologies and supports rapid innovation and scalability via a transport layer 550, a virtualized network function cloud 525 and/or one or more cloud computing environments 575. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 530, 532, 534, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 530 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 550 includes fiber, cable, wired and/or wireless transport elements, network elements and interfaces to provide broadband access 410, wireless access 420, voice access 430, media access 440 and/or access to content sources 475 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 530, 532 or 534. These network elements can be included in transport layer 550.

The virtualized network function cloud 525 interfaces with the transport layer 550 to provide the VNEs 530, 532, 534, etc. to provide specific NFVs. In particular, the virtualized network function cloud 525 leverages cloud operations, applications, and architectures to support networking workloads. The virtualized network elements 530, 532 and 534 can employ network function software that provides either a one-for-one mapping of traditional network element function or alternately some combination of network functions designed for cloud computing. For example, VNEs 530, 532 and 534 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 530, 532, 534, etc. can be instantiated and managed using an orchestration approach similar to those used in cloud compute services.

The cloud computing environments 575 can interface with the virtualized network function cloud 525 via APIs that expose functional capabilities of the VNEs 530, 532, 534, etc. to provide the flexible and expanded capabilities to the virtualized network function cloud 525. In particular, network workloads may have applications distributed across the virtualized network function cloud 525 and cloud computing environment 575 and in the commercial cloud or might simply orchestrate workloads supported entirely in NFV infrastructure from these third-party locations.

Figure 6:
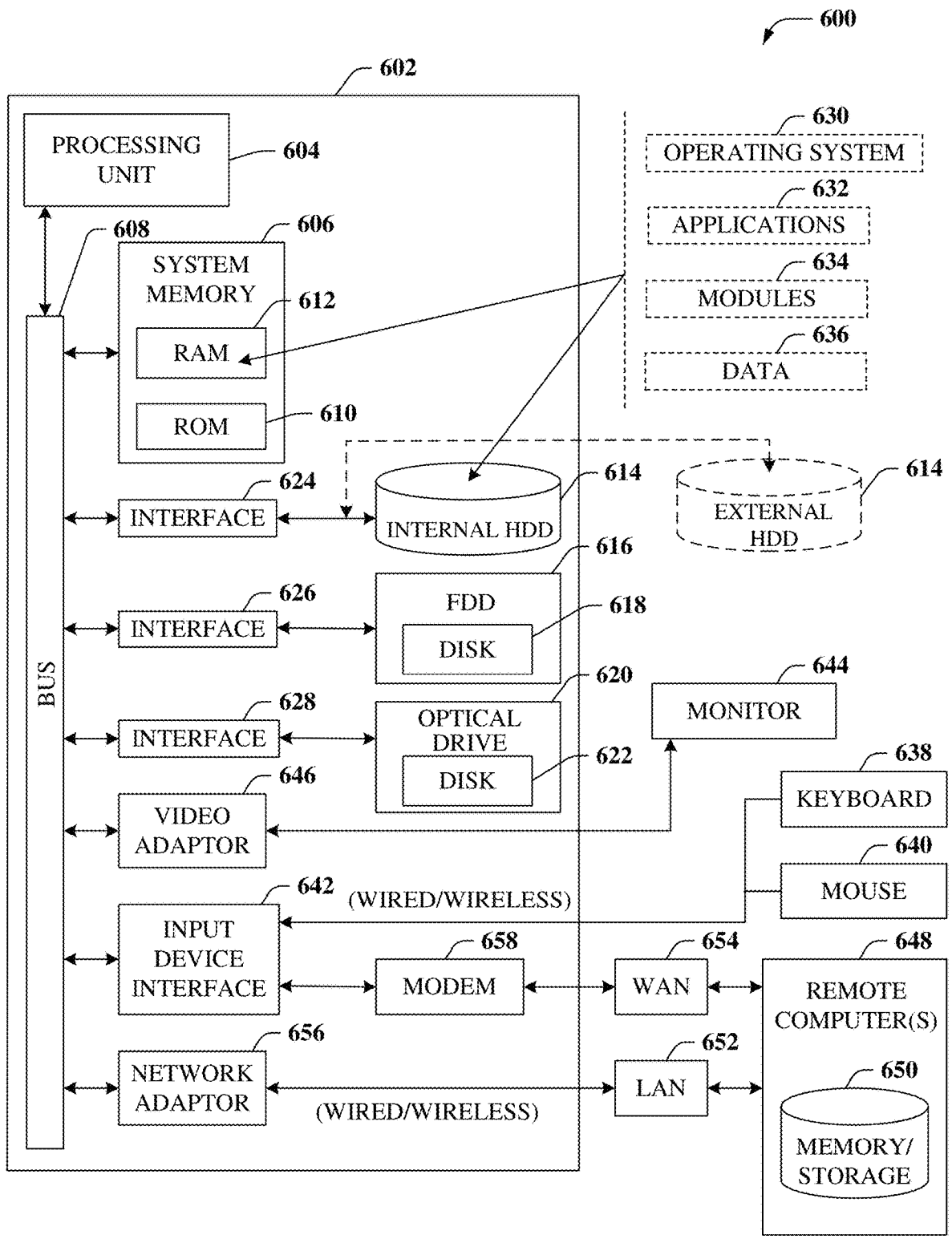
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 450, 452, 454, 456, access terminal 412, base station or access point 422, switching device 432, media terminal 442, and/or VNEs 530, 532, 534, etc. Each of these devices can be implemented via computer-executable instructions that can run on one or more computers, and/or in combination with other program modules and/or as a combination of hardware and software. For example, computing environment 600 can facilitate in whole or in part the knowledge base question and answering systems and methods.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high-capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communication network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 7:
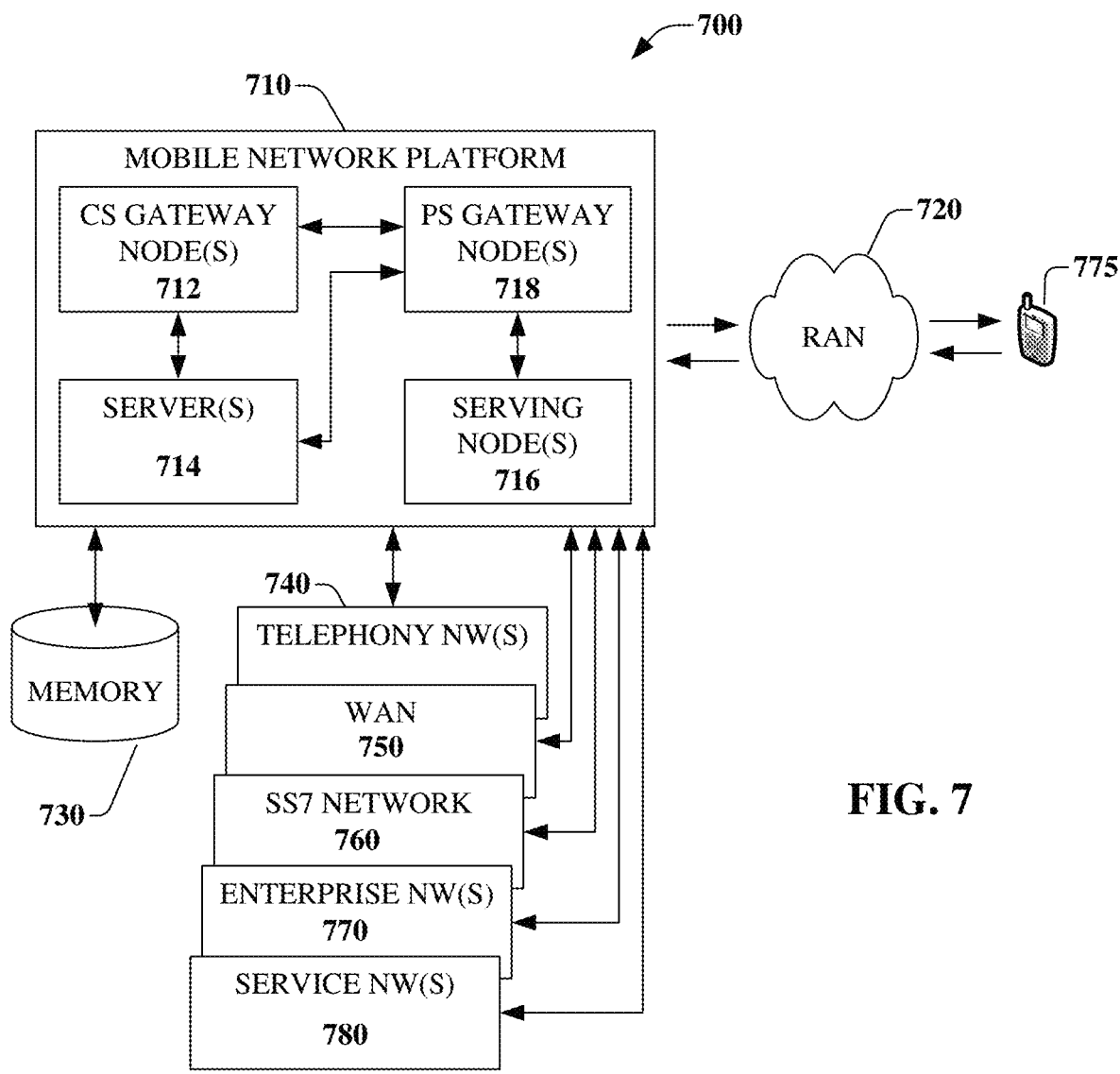
FIG. 7 is a block diagram of an example, non-limiting embodiment of a mobile network platform in accordance with various aspects described herein.

Turning now to FIG. 7, an embodiment 700 of a mobile network platform 710 is shown that is an example of network elements 450, 452, 454, 456, and/or VNEs 530, 532, 534, etc. For example, platform 710 can facilitate in whole or in part the knowledge base question and answering systems and methods. For instance, a radiotelephone 775 may be used to provide a user input in natural language. In one or more embodiments, the mobile network platform 710 can generate and receive signals transmitted and received by base stations or access points such as base station or access point 422. Generally, mobile network platform 710 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 710 can be included in telecommunications carrier networks and can be considered carrier-side components as discussed elsewhere herein. Mobile network platform 710 comprises CS gateway node(s) 712 which can interface CS traffic received from legacy networks like telephony network(s) 740 (e.g., public switched telephone network (PSTN), or public land mobile network (PLMN)) or a signaling system #7 (SS7) network 760. CS gateway node(s) 712 can authorize and authenticate traffic (e.g., voice) arising from such networks. Additionally, CS gateway node(s) 712 can access mobility, or roaming, data generated through SS7 network 760; for instance, mobility data stored in a visited location register (VLR), which can reside in memory 730. Moreover, CS gateway node(s) 712 interfaces CS-based traffic and signaling and PS gateway node(s) 718. As an example, in a 3GPP UMTS network, CS gateway node(s) 712 can be realized at least in part in gateway GPRS support node(s) (GGSN). It should be appreciated that functionality and specific operation of CS gateway node(s) 712, PS gateway node(s) 718, and serving node(s) 716, is provided and dictated by radio technology (ies) utilized by mobile network platform 710 for telecommunication over a radio access network 720 with other devices, such as a radiotelephone 775.

In addition to receiving and processing CS-switched traffic and signaling, PS gateway node(s) 718 can authorize and authenticate PS-based data sessions with served mobile devices. Data sessions can comprise traffic, or content(s), exchanged with networks external to the mobile network platform 710, like wide area network(s) (WANs) 750, enterprise network(s) 770, and service network(s) 780, which can be embodied in local area network(s) (LANs), can also be interfaced with mobile network platform 710 through PS gateway node(s) 718. It is to be noted that WANs 750 and enterprise network(s) 770 can embody, at least in part, a service network(s) like IP multimedia subsystem (IMS). Based on radio technology layer(s) available in technology resource(s) or radio access network 720, PS gateway node(s) 718 can generate packet data protocol contexts when a data session is established; other data structures that facilitate routing of packetized data also can be generated. To that end, in an aspect, PS gateway node(s) 718 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 700, mobile network platform 710 also comprises serving node(s) 716 that, based upon available radio technology layer(s) within technology resource(s) in the radio access network 720, convey the various packetized flows of data streams received through PS gateway node(s) 718. It is to be noted that for technology resource(s) that rely primarily on CS communication, server node(s) can deliver traffic without reliance on PS gateway node(s) 718; for example, server node(s) can embody at least in part a mobile switching center. As an example, in a 3GPP UMTS network, serving node(s) 716 can be embodied in serving GPRS support node(s) (SGSN).

For radio technologies that exploit packetized communication, server(s) 714 in mobile network platform 710 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 710. Data streams (e.g., content(s) that are part of a voice call or data session) can be conveyed to PS gateway node(s) 718 for authorization/authentication and initiation of a data session, and to serving node(s) 716 for communication thereafter. In addition to application server, server(s) 714 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 710 to ensure network's operation and data integrity in addition to authorization and authentication procedures that CS gateway node(s) 712 and PS gateway node(s) 718 can enact. Moreover, provisioning server(s) can provision services from external network(s) like networks operated by a disparate service provider; for instance, WAN 750 or Global Positioning System (GPS) network(s) (not shown). Provisioning server(s) can also provision coverage through networks associated to mobile network platform 710 (e.g., deployed and operated by the same service provider), such as the distributed antennas networks shown in FIG. 1(*s*) that enhance wireless service coverage by providing more network coverage.

It is to be noted that server(s) 714 can comprise one or more processors configured to confer at least in part the functionality of mobile network platform 710. To that end, the one or more processors can execute code instructions stored in memory 730, for example. It should be appreciated that server(s) 714 can comprise a content manager, which operates in substantially the same manner as described hereinbefore.

In example embodiment 700, memory 730 can store information related to operation of mobile network platform 710. Other operational information can comprise provisioning information of mobile devices served through mobile network platform 710, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 730 can also store information from at least one of telephony network(s) 740, WAN 750, SS7 network 760, or enterprise network(s) 770. In an aspect, memory 730 can be, for example, accessed as part of a data store component or as a remotely connected memory store.

In order to provide a context for the various aspects of the disclosed subject matter, FIG. 7, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 8:
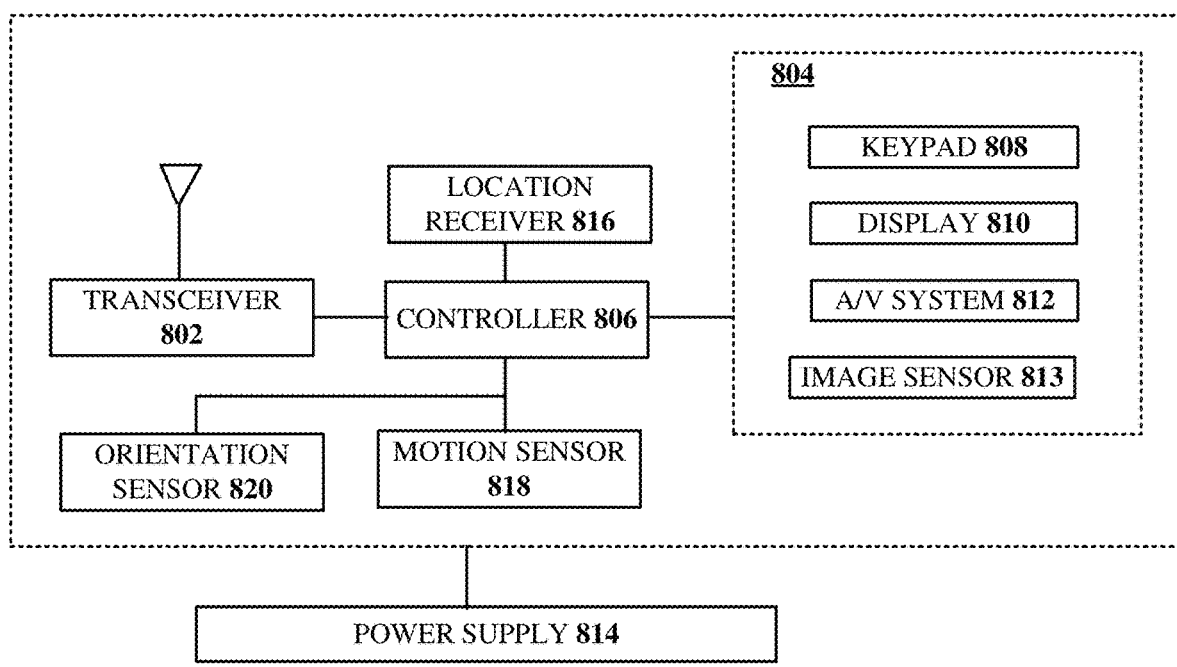
FIG. 8 is a block diagram of an example, non-limiting embodiment of a communication device in accordance with various aspects described herein.

Turning now to FIG. 8, an illustrative embodiment of a communication device 800 is shown. The communication device 800 can serve as an illustrative embodiment of devices such as data terminals 414, mobile devices 424, vehicle 426, display devices 444 or other client devices for communication via either communications network 425. For example, computing device 800 can facilitate in whole or in part the knowledge base question and answering systems and methods.

The communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VOIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface having graphical user interface (GUI) elements that can be selected by a user with a touch of a finger. The display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high-volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable communications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   receiving a user input in a form of a question or query in natural language;
   retrieving a first answer including a list of a first number of documents relevant to the user input by searching indexed documents in a knowledge base;
   applying the first answer to a large language model reader, resulting in a second answer as a generative response, wherein the large language model reader is configured to generate the second answer as a single best response to the user input;
   re-ranking the first answer by using the second answer, resulting in a third answer including a re-ranked list of the first number of documents; and
   generating a final response including the second answer and one or more documents among the third answer.

2. The device of claim 1, wherein the re-ranking the first answer further comprises:
   comparing a similarity level of each document in the list of the first number of documents against the second answer; and
   re-ranking each document in the list of the first number of documents based on the similarity level.

3. The device of claim 1, wherein the re-ranking the first answer further comprises:
   computing a similarity score of each document in the list of the first number of documents against the second answer; and
   re-ranking each document in the list of the first number of documents based on the similarity score.

4. The device of claim 3, wherein the operations further comprise filtering the re-ranked list of the first number of documents to a second number of documents based on a similarity score threshold, wherein the second number of documents includes a reduced number of documents from the first number of documents and exceeding the similarity score threshold among the re-ranked list of the first number of documents.

5. The device of claim 1, wherein the generating the final response further comprises generating the final response including the second answer as the generative response and the one or more documents among the third answer as one or more citations.

6. The device of claim 1, wherein the operations further comprise:
   re-ranking the first answer with reference to the user input in the form of the question or query, separately from and independently of the applying the first answer to the large language model reader, wherein the re-ranking the first answer with reference to the user input results in a fourth answer including another re-ranked list of documents from the list of the first number of documents.

7. The device of claim 6, wherein the operations further comprise:
providing, to a large language model grader, a first reduced number of documents in the third answer; and
providing, the large language model grader, a second reduced number of documents in the fourth answer.

8. The device of claim 7, wherein the operations further comprise:
applying the large language model grader by using a prompt or criteria that grade the first reduced number of documents and the second reduced number of documents with reference to the user input in the form of the question or query; and
wherein the generating the final response further comprises generating the final response including graded results of the first reduced number of documents and the second reduced number of documents.

9. The device of claim 1, wherein the operations further comprise:
providing the first answer, as an additional route, to the re-ranking of the first answer so as to forgo to use, in the additional route, the large language model reader.

10. The device of claim 1, wherein the operations further comprise filtering the re-ranked list of the first number of documents to a second number of documents, wherein the second number of documents includes a reduced number of documents from the first number of documents.

11. The device of claim 1, wherein the second answer further includes a single answer in response to the user input in the form of the question or query.

12. The device of claim 1, wherein the operations further comprise:
preprocessing a plurality of documents in the knowledge base using natural language processing techniques;
indexing the preprocessed plurality of documents contained in the knowledge base using an embedding model; and
storing indices in a vector database that is searchable.

13. A non-transitory machine-readable medium, comprising executable instructions that, when executed by a processing system including a processor, facilitate performance of operations, the operations comprising:
receiving a user input in natural language;
retrieving a first answer including a list of a first number of documents relevant to the user input by searching indexed documents in a knowledge base;
applying the first answer to a large language model reader;
performing first re-ranking of the first answer using an output of the large language model reader, resulting in a re-ranked list of documents and having the first number of documents;
separately from and independently of applying the first answer to the large language model reader, routing the first answer directly to perform second re-ranking, resulting in another re-ranked list of documents from the first answer and having the first number of documents;
providing, to a large language model grader, a first reduced set of documents from the re-ranked list of documents;
providing, to the large language model grader, a second reduced set of documents from the another re-ranked list of documents;
applying the large language model grader by using a prompt or criteria that grade the first reduced set of documents and the second reduced set of documents; and
generating a final response including the output of the large language model reader as a generative response and graded results of the first reduced set of documents and the second reduced set of documents, wherein the large language model reader is configured to output the generative response as a single best response to the user input in natural language.

14. The non-transitory machine-readable medium of claim 13, wherein the using the prompt or criteria further comprises setting the prompt or criteria that grade the first reduced set of documents and the second reduced set of documents against the user input.

15. The non-transitory machine-readable medium of claim 13, wherein the operations further comprise:
filtering the re-ranked list of documents to the first reduced set of documents having a second number, and
filtering the another re-ranked list of documents to the second reduced set of documents having a third number, wherein the second number and the third number are smaller than the first number.

16. The non-transitory machine-readable medium of claim 13, wherein:
the performing the first re-ranking comprises determining a first similarity score of each document in the list of the first number of documents against the output of the large language model reader; and
the performing the second re-ranking further comprises determining a second similarity score of each document in the list of the first number of documents against the user input.

17. A method, comprising:
receiving, by a processing system including a processor, a user input in natural language;
retrieving, by the processing system, a first answer including a list of a K number of documents relevant to the user input by searching indexed documents in a knowledge base;
applying, by the processing system, the first answer to a large language model reader, resulting in a second answer as a generative response, wherein the large language model reader is configured to generate the second answer as a single best response to the user input in natural language;
re-ranking, by the processing system, the first answer, resulting in a third answer including a re-ranked list of documents and having the K number of documents; and
generating a first reduced set of documents from the third answer, wherein the first reduced set of documents includes a J number of documents, and K and J are natural numbers and K is greater than J;
providing, by the processing system, the first reduced set of documents to a large language model grader; and
generating a final response including the second answer and the first reduced set of documents as citations to the second answer.

18. The method of claim 17, wherein the re-ranking the first answer further comprises computing a similarity score of each document in the list of the K number of documents against the second answer, wherein the second answer includes a single generative response.

19. The method of claim 17, further comprising:
separately from and independently of applying the first answer to the large language model reader, providing the first answer, by the processing system, as an additional route, directly to the re-ranking of the first answer so as to forgo to use, in the additional route, the large language model reader, wherein the re-ranking of the first answer, in the additional route, results in a fourth answer.

20. The method of claim 19, further comprising:

generating, by the processing system, a second reduced set of documents from the fourth answer, wherein the second reduced set of documents includes a M number of documents, and M is a natural number and K is greater than M; and providing, by the processing system, the second reduced set of documents to the large language model grader; and wherein the generating the final response further comprises generating the final response including the second answer and grading results of the first reduced set of documents and the second reduced set of documents against the user input.

* * * * *